July 30, 1935. H. E. NASH Re. 19,661

COMPOSITION FOR FUSE, IGNITER CHARGES, AND THE LIKE

Original Filed March 22, 1932

INVENTOR

Henry E. Nash

BY

Busser & Harding

ATTORNEYS.

WITNESS:

Robt R. Kitchel

Reissued July 30, 1935

Re. 19,661

UNITED STATES PATENT OFFICE 19,661

COMPOSITION FOR FUSE, IGNITER CHARGES, AND THE LIKE

Henry E. Nash, Wilmington, Del., assignor to Hercules Powder Company, Wilmington, Del., a corporation of Delaware Original No. 1,960,591, dated May 29, 1934, Serial No. 600,450, March 22, 1932. Application for reissue October 19, 1934, Serial No. 749,120

14 Claims. (Cl. 52—2)

Figure 1:
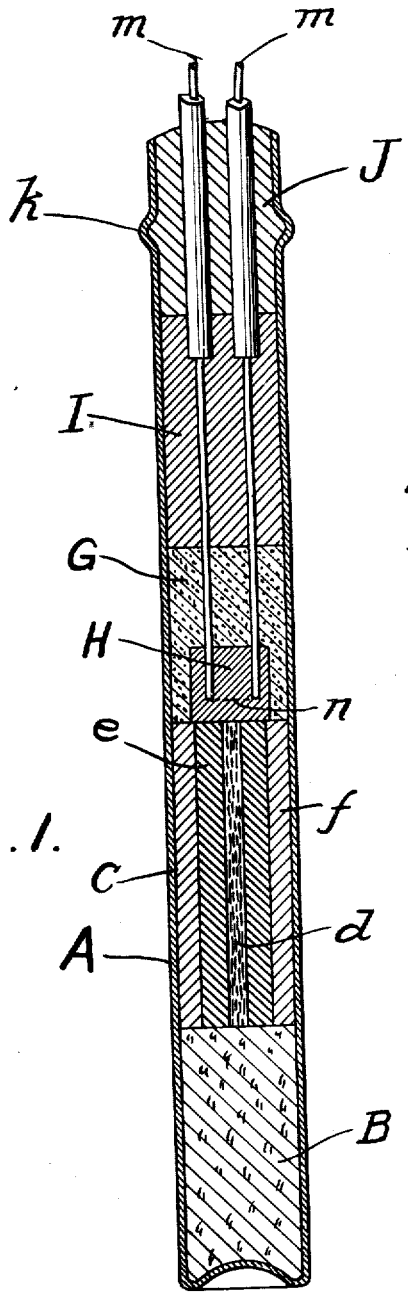

My invention relates to an improvement in delay caps such as are used for detonating explosives when it is desired to detonate several charges successively by means of caps simultaneously ignited.

Heretofore delay caps have comprised essentially a detonating charge, an igniter charge and a fuse through the medium of which the detonating charge is fired, the fuse being cut to such length as will afford desired delay between the firing of the igniter charge and the firing of the detonating charge which effects detonation of the explosives to be detonated. In such caps, as heretofore produced, the ignition elements have been encased in a metallic casing suitably plugged and provided with a vent hole or passage for the escape of gases evolved in the burning of the igniter charge and fuse, the vent hole or passage being customarily closed by means of a frangible material, or material which will not offer a substantial obstruction to the escape of the gases after the fuse is fired.

In delay caps as heretofore produced the provision of a vent has been essential, since a large quantity of gas is rapidly developed in the burning of the igniter charge and fuse, which if not permitted to freely escape from the casing would develop high pressure, which, among other deleterious effects, would cause acceleration of the burning rate of the fuse and consequently premature detonation of the explosive. However, on the other hand, the provision of a vent is objectionable and disadvantageous since the vent however carefully closed, without negation of its function, affords a possible course for the entry of water or moisture into the interior of the casing. Further, premature ignition of the explosive may occur through contact therewith of hot gases from the burning of the fuse which escape through the vent, and irregularity in the burning of the fuse may occur through improper venting or accidental stoppage of the vent which will result in a building up of pressure within the casing.

Now, in accordance with my invention I provide a delay cap of such a character that the necessity for a vent is obviated and consequently in which the igniter charge fuse and detonating charge may be sealed within the casing and positively protected from moisture, and at the same time risk of premature detonation of the explosive through acceleration of the burning rate of the fuse or ignition of the explosive from contact with a flame or hot gases from the delay cap is positively eliminated.

In accordance with my invention I provide broadly a ventless cap, and more particularly a ventless cap furnished with a fuse, and desirably also with an igniter charge, of such a character that on burning no substantial quantity of gas will be evolved, or, where the character of the fuse and/or igniter charge is such as to evolve any substantial amount of gas on burning, I provide means within the cap for absorbing evolved gas to an extent such as to avoid deleterious pressure within the cap.

In the practical adaptation of my invention where it involves the use of a fuse of such character that it will not evolve any substantial amount of gas on burning, I form the fuse, and desirably also the igniter charge, from a mixture of an oxidizing agent and a substance which when burned in the presence of the oxidizing agent will react therewith without producing any substantial quantity of a reaction product in gaseous form.

As illustrative of one practical embodiment of my invention, I may, for example, form the powder charge of the fuse, and desirably also the igniter charge, from a mixture of an oxidizing agent, as, for example, barium peroxide, potassium chlorate, potassium permanganate, red lead ($Pb_3O_4$) or the like, which may be included in amount within say the range 50%–98%, by weight, and, for example, one or more of the elements of the right hand column of group VI of the periodic table, i. e. sulphur, selenium, or tellurium, which may be included in amount within say the range 2%–50%, and to which, if desired, may be added, for example, an inert material as barium oxide, magnesium oxide, lead oxide (PbO), or the like, in amount within say the range 1%–30%, which will exert a control on the rate of burning of the mixture.

Where a metallic oxide is used as the oxidizing agent, it is preferably used in such excess that a solid salt of the metal and the oxy-acid radical formed by the oxidation of the oxidizable element is obtained. For example, using $BaO_2$ or $Pb_3O_4$ and sulphur, $BaSO_4$ or $PbSO_4$ would result, together, of course, with BaO and PbO.

As illustrative of another practical embodiment of my invention, I may form the powder charge of the fuse and also the igniter charge of any suitable materials used for such purposes, using desirably materials which on burning will evolve a minimum of gas, for example, the materials as hereinbefore described may be used, and placed within the cap, in a chamber provided therefor adjacent to the ignition end of the fuse, a substance which will absorb gas evolved in the burning of the fuse and its ignition charge. For example, I may place in the cap as the absorbent a substance such as silica gel, activated charcoal, or the like, which will act to absorb gas evolved in the burning of an ignition charge and fuse of suitable composition, as, for example, potassium chlorate and selenium, to an extent such that no material or deleterious pressure will be developed within the cap.

Figure 2:
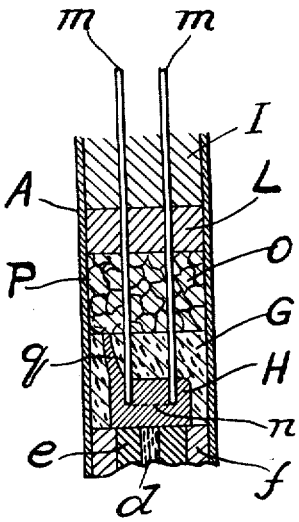

By way of more specifically illustrating the practical embodiment of my invention, when the powder charge of the fuse and the ignition charge are of such character that on firing no substantial amount of gas will be evolved, reference is made to the accompanying drawing, in which:

Fig. 1 is a vertical section through a delay cap embodying such features of the invention; and Fig. 2 is a fragmentary similar vertical section through a modification.

In the drawing A indicates a casing, preferably of metal as, for example, copper. At the bottom of the casing is positioned a detonating charge B, formed, for example, of mercury fulminate or other suitable primary detonating material, or the detonating charge may comprise a primer charge, as mercury fulminate, or the like, and a base charge, such as tetryl, or the like. Above the detonating charge is positioned a fuse C, consisting of a fuse powder *d*, comprising a mixture of, for example, 15% selenium and 85% barium peroxide, within a metal container *e* about which there may be, if desired, a wrapping of cloth, or other suitable material *f*. It will be understood that the length of the fuse C will be made such as to give the desired delay in firing of the detonating charge B after ignition of the fuse.

Above the fuse and for the purpose of igniting it, there is positioned a sulphur plug G provided with a recess filled with an igniter charge H, desirably having the same characteristics as that of the fuse powder *d* and if desired of a similar composition. Above the sulphur plug C is a waterproofing material I of any desired composition and the casing A is closed at the top by means of a sulphur plug J, which when poured enters the crimp *k* and becomes keyed to the casing.

Lead wires *m*, *m* extend into the casing A through plug J, the waterproofing composition I, the plug G and into the igniter charge H. The ends of the lead wires are connected by means of a bridge wire *n*, as is usual in cap construction, and the bridge wire may, if desired, be coated with a readily ignitable composition as, for example, diazodinitrophenol and potassium chlorate, or the like, with a binder as, for example, nitrocellulose, or the like, the binder being in quantity, however, insufficient to produce any substantial quantity of gas on burning.

By way of more specifically illustrating the practical embodiment of my invention where means are provided to absorb gaseous reaction products which may be evolved, reference is made to the accompanying drawing, Figure 2, which is a sectional view of a cap embodying my invention, the upper and lower portions being broken away. In the cap illustrated by Figure 2, A indicates the casing, H the igniter charge, *n* the bridge wire, *m*, *m* the lead wires and *e* the fuse, wrapped as indicated at *f*, and having a powder charge *d* of any suitable composition, that is to say, one which will not give off an excessive amount of gas. Desirably, for example, the charge may be composed of potassium chlorate and selenium. G indicates a sulphur plug which confines the igniter charge and in which is formed a passage *d* opening into a chamber in the casing above the plug G closed at its top by a plug L, which prevents entry of the waterproof sealing material I. The chamber is filled with adsorbent material *o*, which may be silica gel, activated carbon, or an absorbent material which will chemically react with the evolved vapors to produce a solid. If desired, the passage *q* may be eliminated when the plug G is made a loose fit in the casing.

As further illustrative of a practical embodiment of my invention, the fuse, and/or the igniter charge may comprise a mixture of red lead and sulphur, in various proportions, say for example, 85%–98% red lead and 2%–15% sulphur, and to which, if desired, may be added an inert material or an active oxidizing material to decrease or increase the burning rate. A satisfactory composition may, for example, involve red lead 97.2% and sulphur 2.8%, the ingredients being suitably ground by being mixed together, water added to form a paste, the paste ground in a ball mill and then dried in a current of warm air. The cake formed on drying of the paste is broken up and heated at an elevated temperature, say 120–130° C., to harden the powder and render it suitable for graining, say for one and one-half hours. It will be appreciated that the temperature and time used in hardening the powder may be widely varied. As has been indicated the powder may contain an inert substance or an oxidizing agent in addition to red lead and sulphur. Thus, for example, a satisfactory powder is comprised of red lead 91%, sulphur 3% and lead oxide (litharge) 6%. The red lead and sulphur composition will on burning produce a minimum of gas and at the same time will have the advantages of substantial resistance to moisture and a fixed burning rate. Selenium or tellurium may be substituted for sulphur in the combination with red lead.

The operation of the delay cap in accordance with my invention will, it is believed, be obvious, it being understood that on closing an electric circuit through the lead wires *m*, *m* the bridge wire *n* will be highly heated or fused, the igniter charge H will be ignited and will ignite the fuse C, which on burning down to the detonating charge B will fire it for the detonation of an explosive charge with which the cap is associated. When the powder charge of the fuse and the igniter charge are such as not to evolve any substantial amount of gas on burning, the cap is arranged as shown in Fig. 1. On the other hand, if it is desired to use a powder charge and an igniter charge of such a composition as will evolve a substantial amount of gas, the cap will contain an absorbent material, as shown in Fig. 2, and the evolved gas passing through the passage *q*, or by plug G will be sufficiently absorbed by the absorbent material as to avoid the development of deleterious pressure within the cap.

It will be noted that the cap embodying my invention is not provided with any vent, the charges and fuse being confined within the casing and positively protected, and it will be noted that in the burning of the ignition charge and of the fuse no substantial evolution of gas will occur due to the composition of the powder comprised in the charge and fuse, or that if in the case of any suitable charge any substantial amount of gas is evolved, it will be absorbed with avoidance of deleterious pressure within the cap.

It will be further understood that I contemplate my invention as applicable to delay igniters as well as to delay caps in connection with which, more particularly, I have described my invention herein. When the invention is applied to a delay igniter, for the ignition of, for example, black powder, as will be obvious the structure illustrated and described herein will be modified to the extent that a match composition, consisting, for example, of black powder, fulminate-chlorate-charcoal-nitrostarch mixture, or the like, will be substituted for the detonating charge B and the bottom of the casing A will be left open, the match composition being protected from moisture by a coating of lacquer or other suitable waterproofing. Hence, it will be understood that I contemplate a delay igniter as the equivalent of a delay cap and as within the scope of the claims appended hereto, in which the term "a detonating charge" will be understood to include a match composition or igniter.

It will be understood that I do not intend my invention to be limited by the specification of particular compounds or compositions herein, nor to the cap structure described herein for purposes of illustration, since I contemplate as within the scope of my invention the use of any compound or composition operably equivalent for those specified, and where an absorbent is used, I contemplate the use of any absorbent or adsorbent material or other means for avoiding the development of deleterious gas pressure within a cap, and of any suitable charging composition. Further, it will be understood that I do not limit the application of my invention to a cap the casing of which is ventless, since under conditions the casing may be desirably vented, as for example, vented more or less for the escape of any excess gas developed or not absorbed by the absorbent material.

I have not claimed herein the delay cap described. This delay cap forms the subject matter of an application, Serial No. 440,696, filed April 1, 1930, and a continuation in part thereof, Serial No. 542,576, filed June 6, 1931. This application is a continuation in part of application Serial No. 542,576, filed June 6, 1931, which is a division of the application bearing Serial No. 440,696.

What I claim and desire to protect by Letters Patent is:

1. A composition for use as a charge for fuse, as an igniter charge or the like, including an oxidizing agent and selenium, the oxidizing agent being of such character that when the selenium is burned in its presence it will react with the selenium without the production of any substantial quantity of gaseous products.

2. A composition for use as a charge for fuse, as an igniter charge or the like, including barium peroxide and selenium.

3. A composition for use as a charge for fuse, as an igniter charge, or the like, including red lead and sulphur.

4. A composition for use as a charge for fuse, as an igniter charge, or the like, including red lead, sulphur, and litharge.

5. A composition for use as a charge for fuse, as an igniter charge or the like, including an element selected from the group consisting of sulphur, tellurium and selenium and an oxidizing agent which on combustion will combine with an element from said group without the development of any substantial quantity of gaseous products.

6. A composition for use as a charge for fuse, as an igniter charge or the like, including barium peroxide and an element selected from the group consisting of sulphur, tellurium and selenium.

7. A composition for use as a charge for fuse, as an igniter charge or the like, including an oxidizing agent comprising a metallic oxide and an element selected from the group consisting of sulphur, tellurium and selenium.

8. A composition for use as a charge for fuse, as an igniter charge or the like, including red lead and an element selected from the group consisting of sulphur, tellurium and selenium.

9. A composition for use as a charge for fuse, as an igniter charge or the like, including an element selected from the group consisting of sulphur, tellurium and selenium and an oxidizing agent which on combustion will combine with an element from said group without the development of any substantial quantity of gaseous products and an inert material which will exert a control on the burning rate of the composition.

10. A composition for use as a charge for fuse, as an igniter charge or the like, including an element selected from the group consisting of sulphur, tellurium and selenium and an oxidizing agent which on combustion will combine with an element from said group without the development of any substantial quantity of gaseous products and an inert material which will exert a control on the burning rate of the composition in amount within the range 1–30%.

11. A composition for use as a charge for fuse, as an igniter charge or the like, including barium peroxide, an element selected from the group consisting of sulphur, tellurium and selenium and an inert material which will exert a control on the burning rate of the composition.

12. A composition for use as a charge for fuse, as an igniter charge or the like, including barium peroxide, selenium and an inert material which will exert a control on the burning rate of the composition.

13. A composition for use as a charge for fuse, as an igniter charge, or the like, including red lead, sulphur and an inert material which will exert a control on the burning rate of the composition.

14. A composition for use as a charge for fuse, as an igniter charge or the like, including barium peroxide, selenium and an inert material which will exert a control on the burning rate of the composition in amount within the range 1–30%.

HENRY E. NASH.